July 7, 1970  J. L. ALTEKRUSE ETAL  3,519,222
AUGMENTED GRAVITY GRADIENT SATELLITE STABILIZATION SYSTEM
Filed Jan. 27, 1967

INVENTORS
JOHN L. ALTEKRUSE
ALBERT C. BUXTON
BY:
*Oldham & Oldham*
ATTORNEYS

United States Patent Office 3,519,222
Patented July 7, 1970

3,519,222
AUGMENTED GRAVITY GRADIENT SATELLITE STABILIZATION SYSTEM
John L. Altekruse, Cuyahoga Falls, and Albert C. Buxton, Akron, Ohio, assignors to Goodyear Aerospace Corporation, Akron, Ohio, a corporation of Delaware
Filed Jan. 27, 1967, Ser. No. 612,235
Int. Cl. B64g 1/00
U.S. Cl. 244—1                     8 Claims

ABSTRACT OF THE DISCLOSURE

An augmented gravity gradient satellite stabilization system is defined which includes, an electronic control element to measure deflections of the satellite relative to a known reference to thereby generate correction signals to control small thrust rockets and/or an electric torquer to counteract the displacing forces.

---

Figure 1:
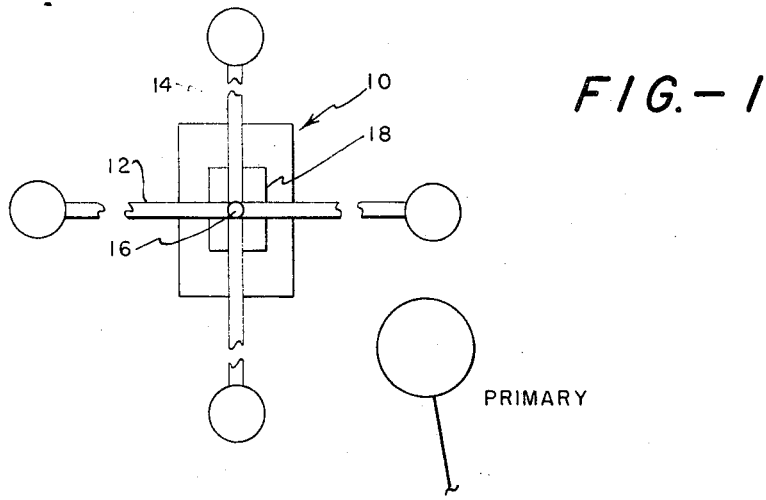

Heretofore, it has been well known that gravity gradient stabilization techniques can be utilized to stabilize satellites in earth orbiting paths without the use of small attitude-control rockets. Such gravity gradient systems utilize mass concentrations at different ends of a long connecting axis so that the differential pull of gravity between the two connected mass points stabilizes the oscillations about the system's center of mass and along the axis between the two mass concentrations. However, this system is quite easily upset, and does take rather a long period of time to settle out and lacks sufficient stiffness. Thus, any augmentation to the gravity gradient stabilization which will greatly reduce the time to achieve stabilization, and increase the effective stiffness and hold such stabilization substantially indefinitely on very low power and reliable system requirements is needed by the art.

Therefore, it is the general object of the present invention to meet the needs of the art by providing an augmented gravity gradient satellite stabilization system wherein measurements of the deflection of the satellite relative to a reference orientation are utilized to generate correction signals to control small thrust rockets and an electric torquer to counteract the displacing forces.

A further object of the invention is to provide a selective gravity gradient augmentation system for satellite stabilization which measures the angular displacement of the gravity gradient boom with respect to a reference on the satellite to thereby provide correcting signals to either a torquer and/or a small thrust control rocket connected to the satellite.

A further object of the invention is to provide an augmentation and improved damping and control system for the prior art gravity control damping system such as the NASA-AMES damper, and the Vertistat gravity gradient stabilization system, as made by Convair Division of Dynamics of San Diego, Calif.

The aforesaid objects of the invention and other objects which will become apparent as the description proceeds are achieved by providing in a gravity gradient stabilization system for a passive satellite, the combination of a satellite housing, gravity gradient sensing boom means pivotally connected at approximately the center thereof to the satellite housing and carrying concentrated weight in the ends thereof, means to sense the angular deflection of the boom means relative to a predetermined orientation with the housing, spring means between the boom means and the housing tending to bias the boom means to a predetermined relation with the housing, a dash-pot actuated by the relative movement between the boom means and the housing to dissipate energy, and an electro magnetic torquer driven in accordance with a combination of the angular deflection and angular rate means and predetermined orientation to assist in stabilizing the boom means relative to the predetermined reference.

Figure 2:
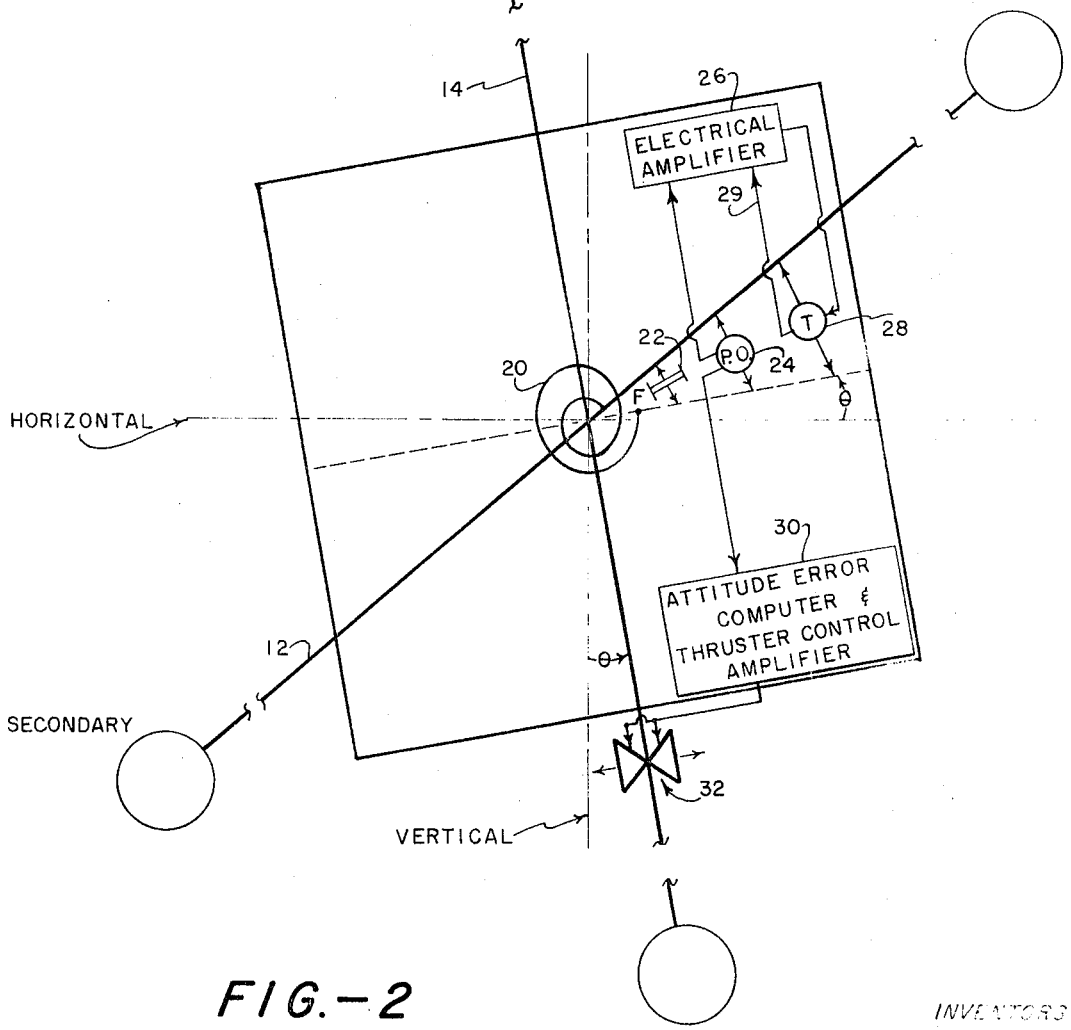

For a better understanding of the invention, reference should be had to the accompanying drawings, wherein:

FIG. 1 is a reduced size illustration of a gravity gradient earth orbiting satellite constructed in accordance with the principles of the invention, and FIG. 2 is a schematic illustration of the circuitry associated with the satellite of FIG. 1 to achieve the desired augmented damping objectives of the invention.

The "Vertistats" form of gravity gradient stabilization as developed by Convair Division of General Dynamics is a passive damping capability for a gravity gradient earth orbiting satellite, as is well known in the art. The present invention utilizes a measurement of the gravity gradient boom displacement angle and its rate of change in a unique manner to control the firing of low level thrust jets or rockets which increase the attitude restoring and damping torques of the stabilization system, as well as utilizing an electric torquer to modify the effective spring constant and effective damping constant now utilized with the Vertistats system. No active attitude reference sensor such as horizon scanners, star trackers or gyroscopes are employed. The present invention is designed to overcome errors in gravity gradient stabilization caused by solar pressure, aerodynamic drag, orbital eccentricity and interaction between any magnetic dipole moment aboard the satellite with the earth's magnetic field. Indeed, attitude errors caused by any steady bias components of disturbance torque may be totally eliminated. Attitude errors caused by components of disturbance torques which are periodic on a once per orbit basis may be reduced by a factor of 1.5 to 2.0. Significant reduction of error may also be obtained in the response to those components of perturbing torque which are periodic on a more than once per orbit basis.

The usual form of gravity gradient stabilization is unique in that the attitude reference sensors and control actuators are implicit manifestations of the pendulous mass distribution of the satellite being stabilized rather than any instrumented sensing and actuating devices. The attitude error sensors and actuators exist virtually in the mass configuration of the satellite. Thus far, no practical methods have been developed whereby a transducer can convert these virtual gravity gradient error signals into an indicated displacement of some type of pickoff. Hence, the gravity gradient error signals are unavailable to the control system designer, who must be content to deal with them on a virtual basis through built-in design of the appropriate moments of inertia about the principal axes of the satellite. The object of this invention is to produce a useful dynamic function of the gravity gradient error signals, then utilize these signals to command auxiliary jets or other form of reaction device whose reaction torques add constructively to the existing gravity gradient torques to effectively increase the apparent stiffness and stability of the basic gravity gradient stabilization system.

Thus, it should be understood that the invention corrects or augments corrections for gravity gradient restoring torques (those proportional to angular displacement) and gravity gradient damping torques (those proportional to rate of change of angular displacement).

With respect to FIG. 1 of the drawings, the numeral 10 indicates an earth orbiting satellite to which gravity gradient booms 12 and 14 are mounted. Specifically, boom 14 is mounted in fixed aligned relationship to satellite 10 while boom 12 is pivotal around point 16 relative thereto. The fixed boom 14 is mounted in known relationship to a gradient control package 18 while the pivotal boom 12 is pivoted at approximately the center of the package 16, 18, as clearly indicated in FIG. 1. Normally boom 12 will be pivoted substantially in the plane of the boom 14, or in the orbital plane of the satellite.

The package 18 is illustrated in great detail in FIG. 2 of the drawings. To simplify the description of the apparatus, and the parameters in which it operates, consideration here is limited to the pitch axis or to motion contained within the orbital plane, although it must be remembered similar systems could be provided for other planes. Likewise, the mass distributions of the gravity gradient booms are idealized to simulate dumbbells with the connecting rods indicated as lines through the pivot point 16.

In FIG. 2, the satellite 10 is represented by the primary dumbbell or boom 14 being designated with a moment of inertia, $I_1$. The vertistat or pivotal boom 12 is represented by the secondary dumbbell of moment of inertia, $I_2$. The vertistat boom is pivoted about the pitch axis with restraint by a torsion bar or coil spring 20, having a force indicated by K, and an equivalent viscous dash-pot damping 22, designed at F. The known condition on the torsion bar spring 20 corresponds to the vertistat boom 12 being perpendicular to the primary dumbbell boom 14.

In order to meet the desired objects of the invention, an electrical pickoff 24 is provided to measure the angular displacement between the boom 12 and its normal 90° relationship with the boom 14. This angular pickoff may be selectively sent to an electric amplifier 26 which then sends a signal to an electrical torquer 28 adapted to apply a torque between the two booms 12 and 14, which is proportional to the displacement angle and its rate of change. It may be seen that the torquer 28 operates directly in parallel with the mechanical spring 20 and the dash-pot 22 connected between the two booms and tends to null the angle of displacement.

Further, the pickoff signal may selectively be sent to an attitude error computer or electronic control amplifier 30 which in turn supplies a corrective signal to an augmentation jet thruster 32 which develops mass expulsion reaction torques to accelerate the primary boom 14.

The phase and magnitude of these augmentation torques are determined in accordance with the relationship $T_A = C(s) \times$ (angle of boom displacement) where $C(s)$ is a dynamic control function which should be optimized in accordance with both transient and steady-state response requirements. This dynamic control function may consist of a simple but somewhat unusual combination of integral, proportional, and derivative operations on the angle of displacement between the booms.

In order to completely eliminate the need for the spring 20 and dash-pot 22, there may be a feedback line 29 from the torquer 28 to the amplifier 26 acting as a loop to close the corrective action of the torquer.

It should be pointed out that this concept has departed from the dieally inactive purely passive gravity gradient system to the following extent:

(1) The addition of an angular pickoff and torquer which are connected between the two booms and made of highly reliable coil wound components; the control amplifier for driving the electro-magnetic torquer may be made of reliable solid state components with very little power consumption; and (2) The addition of augmentation thrusters which may be of the subliming jet variety in the $10^{-6}$ to $10^{-2}$ pound thrust category such as those being developed by Rocket Research Corporation, Seattle, Wash., as described in the Sept. 28, 1964, edition of Missiles and Rockets on page 18. The control amplifier which implements the jet augmentation control function may be made of very reliable solid state components wiht very little power consumption.

Specifically, the invention contemplates that the electrical control signal for the torquer will be equal to $M \times$ (the angle of displacement between the booms) plus $Ns \times$ (the angle of displacement between the booms) where M equals the torque constant of the electromagnetic torquer 28 and N equals the damping torque constant of the electromagnetic torquer 28 and $s$ is equal to a time derivative operator measuring the rate of change of the angular displacement or deflection between the booms. This electrical control signal will apply both positive and negative signals to the torquer. The amplifier 26 can easily perform this necessary measurement, all in a manner well known to one skilled in the art.

The error computer or electronic control amplifier 30 utilizes displacement between the booms as determined by the pickoff 24 to generate a direction signal equal to $C(s)$ which is equal to $$-\left[\frac{K_0}{s} - \frac{K_1 + K_2 s}{1 + m K_2 s}\right] \times \text{the angle of displacement between the booms}$$

In the formula above, the symbols have the following designations:

$K_0$ = integral control negative feedback constant.
$K_1$ = proportional control positive feedback constant.
$K_2$ = derivative negative feedback damping constant.
$m$ = parameter determining the upper frequency limit of negative damping feedback.
$s$ — time derivative operator.

While it should be recognized that there are probably other desirable forms of the augmentation control function besides the equation above, the system performance utilizing the equation above as the augmentation control function verify its usefulness. It should clearly be understood that any suitable digital or analog device or sample data processor to solve the equation above and produce an output signal to control the thruster 32 will meet the objects of the invention.

Thus, it should be understood that the invention operates on a conventional gravity gradient stabilization system for an earth orbiting satellite by measuring the angular deflection between a pivotal boom and a stationary boom to automatically drive an electrical torquer to dissipate energy and tend to return the booms to a predetermined relationship, as well as a computerized signal to a small valveless control rocket on the stationary boom to control the pitch of the satellite, in accordance with the proper signal from the computer. These additional damping features can work alone or in combination, or the satellite can operate with only the gravity gradient system functioning, all as selectively desired.

What is claimed is:

1. In a gravity gradient stabilization system for a satellite, the combination of
    a satellite housing,
    gravity gradient sensing boom means extending from the satellite housing, one boom means being in fixed relationship thereto and the other in pivoted relationship thereto, each boom means carrying concentrated weight in the ends thereof,
    means to sense the angular deflection of the pivotal boom means relative to a predetermined reference,
    spring means between the boom means and the housing tending to restore the boom means to the predetermined orientation,
    a dash-pot actuated by relative movement between the boom means and the housing to dissipate energy, and
    positive control means driven in accordance with the angular deflection between the boom means and the predetermined reference to assist in stabilizing the pivotal boom means relative to the predetermined reference.

2. A stabilization system for a satellite according to claim 1 where the active means is an electromagnetic torquer driven by an electrical signal representing the torque constant of the torquer times the angular displacement between the pivotal boom and the predetermined reference plus the damping torque constant of the torquer times a time derivative operator times the angular displacement between the pivotal boom and the predetermined reference.

3. A stabilization system for a satellite according to claim 1 where the means to positively stabilize the satellite includes a valveless thruster rocket mounted near one end of the stationary boom and controlled in firing in one direction or the other to controlled pitch of the satellite by a dynamic control function optimized in accordance with both transient and steady-state response requirements dependent upon the angular displacement between the pivotal boom and the stationary boom.

4. A stabilization system for a satellite according to claim 1 where the augmentation torque means may be generated for both the pitch axis and the roll axis of the satellite as determined by the proper positioning of the pivotal boom to an intermediate position between the pitch and roll axis of the satelite.

5. A stabilization system for a satellite according to claim 2 which includes an amplifier to produce the electrical signal to drive the torquer, and which includes a feedback loop from the torquer to the amplifier to permit total elimination of the need for any mechanical spring feedback and dash-pot damping.

6. In a gravity gradient stabilization system for a satellite, the combination of
a satellite housing,
gravity gradient sensing boom means extending from the satellite housing, one boom means being in fixed relationship thereto and the other in pivoted relationship thereto,
means to sense the angular deflection of the pivotal boom means relative to the fixed means, and
positive control means driven in accordance with the angular deflection between the pivotal boom means and the fixed boom means to assist in stabilizing the satellite.

7. A stabilization system for a satellite according to claim 6 where the active means is an electromagnetic torquer driven by an electrical signal representing angular displacement between the pivotal boom and the stabilized boom, and the rate of angular change thereof.

8. A stabilization system for a passive satellite according to claim 6 where the means to positively stabilize the satellite includes a valveless thruster rocket mounted to near the proximity of one end of the stationary boom and controlled in firing in one direction or the other to controlled pitch of the satellite by a dynamic control function optimized in accordance with both transient and steady-state response requirements dependent upon the angular displacement between the pivotal boom and the stationary boom, and respectively by the formula $$-\left[\frac{K_0}{s} - \frac{K_1 + K_2 s}{1 + m K_2 s}\right] \times \text{the angle of displacement between the booms}$$

where
$K_0$=integral control negative feedback constant,
$K_1$=proportional control positive feedback constant,
$K_2$=derivative negative feedback damping constant,
$m$=parameter determining the upper frequency limit of negative damping feedback, and
$s$=a time derivative operator.

References Cited
UNITED STATES PATENTS

| | | | |
|---|---|---|---|
| 3,168,263 | 2/1965 | Kamm | 244—1 |
| 3,268,183 | 8/1966 | Etkin | 244—1 |
| 3,282,532 | 11/1966 | Tinling et al. | 244—1 |

FERGUS S. MIDDLETON, Primary Examiner